United States Patent Office 3,553,330
Patented Jan. 5, 1971

3,553,330
ANIMAL FEED COMPOSITIONS AND METHODS EMPLOYING CERTAIN 2-HALOACETAMIDES
Ernest G. Jaworski, Olivette, and Gino J. Marco, Webster Groves, Mo., assignors to Monsanto Company, St. Louis, Mo., a corporation of Delaware
No Drawing. Filed Nov. 20, 1967, Ser. No. 684,470
Int. Cl. A61k 27/00
U.S. Cl. 424—324    15 Claims

ABSTRACT OF THE DISCLOSURE

Animal feed composition containing at least one compound of the formula

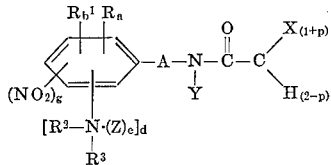

wherein X is halogen (Cl, Br, F and I), $p$ is an integer from 0 to 2 inclusive, A is selected from the group consisting of alkylene of not more than 6 carbon atoms and alkenylene of at least 3 and not more than 6 carbon atoms, R is selected from the group consisting of alkyl, alkenyl and alkoxy of not more than 4 carbon atoms, $a$ is an integer from 0 to 5, $R^1$ is halogen (Cl, Br, F and I), $b$ is an integer from 0 to 3, $R^2$ and $R^3$ are selected from the group consisting of hydrogen and alkyl of not more than four carbon atoms, $e$, $d$ and $g$ are each integers from 0 to 1, Z is an acid forming a physiologically acceptable acid addition salt, and Y is selected from the group consisting of hydrogen, alkyl, alkenyl, alkynyl, phenyl, phenylalkyl and cinnamyl of not more than 12 carbon atoms.

---

This invention relates to animal feed compositions and to methods of improving growth response in animals.

In accordance with the present invention, it has now been found that certain 2-haloacetamides are useful growth promoters for animals. Animal diets containing the 2-haloacetamides elicit a substantially greater weight gain and feed efficiency response in animals than when said diets are used alone. The growth promoting compounds are also useful for the improvement of carcass quality in cattle as manifested by increased marbling.

The improved weight gain and feed efficiency response in animals is accomplished in accordance with this invention by a method which comprises administering to the animal a growth-promoting amount of at least one 2-haloacetamide of the formula

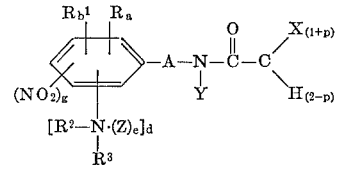

wherein X is halogen (Cl, Br, F and I), $p$ is an integer from 0 to 2 inclusive, A is selected from the group consisting of alkylene of not more than 6 carbon atoms and alkenylene of at least 3 and not more than 6 carbon atoms, R is selected from the group consisting of alkyl, alkenyl and alkoxy of not more than 4 carbon atoms, $a$ is an integer from 0 to 5, $R^1$ is halogen (Cl, Br, F and I), $b$ is an integer from 0 to 3, $R^2$ and $R^3$ are selected from the group consisting of hydrogen and alkyl of not more than four carbon atoms, $e$, $d$ and $g$ are each integers from 0 to 1, Z is an acid forming a physiologically acceptable acid addition salt, and Y is selected from the group consisting of hydrogen, alkyl, alkenyl, alkynyl, phenyl, phenylalkyl and cinnamyl of not more than 12 carbon atoms.

The compounds of the above formula are useful in animal feeds generally, for example, poultry, swine and ruminant feeds, but they are particularly advantageous when employed in ruminant feeds for cattle and sheep.

In the above formula R can be alkyl such as methyl, ethyl, n-propyl, isopropyl, n-butyl, sec-butyl, isobutyl and tert-butyl, alkenyl such as vinyl, allyl, n-butenyl-1-and n-butenyl-2, and alkoxy such as methoxy, ethoxy, propoxy, butoxy and isobutoxy. The alkyl of $R^2$ and $R^3$ can be those listed above for R.

The alkylene of A can be, for example, methylene, ethylene, propylene, isobutylene, butylene and the like. The alkenylene of A can be, for example, propenylene, butenylene, pentenylene and the like.

Representative Y radicals for the 2-haloacetamides of this invention include hydrogen, alkyl such as methyl, ethyl, n-propyl, isopropyl, n-butyl, sec-butyl, isobutyl, tert-butyl, amyl, hexyl, heptyl, octyl, nonyl, decyl, dodecyl and the various homologues and isomers of alkyl of not more than 12 carbon atoms, alkenyl such as vinyl, allyl, n-butenyl-1, n-butenyl-2, n-pentenyl-2, n-hexenyl-2, 2,3-dimethylbutenyl-2, n-heptenyl, n-decenyl, n-dodecenyl and the various homologues and isomers of alkenyl of not more than 12 carbon atoms, alkynyl such as propargyl, butynyl, pentynyl and the various homologues and isomers of alkynyl of not more than 12 carbon atoms, phenyl, phenylalkyl such as benzyl, phenylethyl, 4-phenylbutyl and the like and cinnamyl.

Acids which can be used in the preparation of the physiologically acceptable acid addition salts of the above 2-haloacetamides include, for example, inorganic acids such as hydrochloric acid, hydrobromic acid, sulfuric acid, phosphoric acid, nitric acid, and the like and organic acids such as acetic acid, trichloroacetic acid, benzoic acid, 2,4-dinitrobenzoic acid, succinic acid, tartaric acid, phthalic acid, and the like.

In the above Formula Z is preferably an inorganic acid such as HCl and HBr.

The compounds of the above formula can be prepared by reaction of the appropriate N-phenylalkylamine or N-phenylalkenylamine with a haloacetyl halide under the conditions and processes described in detail in U.S. application Ser. No. 684,494 (Docket No. Case AG–617) filed of even date herewith and U.S. Pat. 2,863,752.

The 2-haloacetamides of this invention can be prepared by haloacetylation of suitable substituted or unsubstituted phenylalkenyl amines. The haloacetylating agent is preferably either a haloacetic anhydride, such as chloroacetic anhydride, or a haloacetyl halide, such as chloroacetyl chloride, bromoacetyl bromide, or the like. The choice of haloacetylating agent is determined to some extent by the nature of the ortho substitution of the phenylalkenylamine to be acetylated. Thus, the haloacetic anhydride is ordinarily used with a difficulty acetylated amine but it is usually preferred to use a haloacetyl halide to acetylate the more reactive amines.

The haloacetylation reaction is preferably conducted in the presence of a suitable organic medium. The organic medium must be anhydrous if the acetylating agent is a haloacetic anhydride. However, either anhydrous media or media containing water can be used with haloacetyl halide acetylating agents. Suitable organic media for use with either acetylating agent include, for example, benzene, diethyl ether, hexane, methylethyl ketone, chlorobenzene, toluene, chloroform, and the xylenes. Preferably an acid acceptor is present in the reaction zone to neutralize the acid formed. Suitable acid acceptors for anhydrous systems include the aromatic amine reactants, which can be present in the reaction zone in an amount greater than that required for the acetylation, tertiary amines and pyridine. Acid acceptors in aqueous systems include alkali or alkaline earth hydroxides and alkali or alkaline earth metal carbonates or bicarbonates.

The haloacetylation reaction is generally carried out at temperatures below room temperature, and is preferably carried out in the range of from about 0° C. to about 15° C. The reaction is preferably carried out at atmospheric pressure although subatmospheric pressure and superatmospheric pressure can be used. Although haloacetylation can be carried out using equimolar amounts of reactants, it is preferred that from 2 to 5% of an excess of the acetylating agent be used. The acetanilide products can be separated from the reaction mixture by methods well known to those skilled in the art, for example, distillation or fractional crystallization from the reaction medium or from solvents.

The following examples will illustrate the invention. In the following examples as well as in the specification and appended claims, parts and percent are by weight unless otherwise indication.

EXAMPLE 1

A reaction vessel was charged with 1 mole of N-isopropyl-N-cinnamylamine, 2000 ml. of chloroform and 2 moles of sodium carbonate. Thereafter, 1.2 mole of chloroacetyl chloride was added slowly with stirring over a period of 30 minutes while maintaining the temperature below 10° C. At the end of this time, the oil layer formed was separated and washed first with 300 ml. of 3% hydrochloric acid and then twice with warm water. The solvents were removed by evaporation at reduced pressure and the syrup obtained was crystallized from heptane and then dilute methanol to give N-isopropyl-N-cinnamyl-2-chloroacetamide having a boiling point of 187–195° C. at a pressure of 2–3 mm. of Hg. Analysis of this product gave 14.11% chlorine which is the same as the calculated value for chlorine.

The following 2-haloacetamides of this invention were prepared by the same or similar procedures as in Example 1 above.

Example:     Compound and properties
2 -------- N - n-butyl - N-cinnamyl-2-chloroacetamide. B.P.: 200° C. at 1 mm. Hg. Percent chlorine, calc'd: 13.37. Found: 13.68.
3 -------- N - n - hexane-N-cinnamyl-2-chloroactamide. B.P.: 207–215° C. at 3–4 mm. of Hg. Percent chlorine, calc'd: 12.09. Found: 12.15.
4 -------- N - (4-methoxycinnamyl)-2-chloroacetamide. B.P.: 185–190° C. at 0.5–1 mm. of Hg. Percent chlorine, calc'd: 15.85. Found: 15.99.
5 -------- N - (4 - chlorocinnamyl)-2-chloroacetamide. B.P.: 80–85° C. at 1 mm. of Hg. $n_D^{20}$=1.536.
6 -------- N - (3,4 - dichlorocinnamyl) - 2-chloroacetamide. B.P.: 136–144° C. at 2 mm. of Hg. $n_D^{20}$=1.5555.
7 -------- N,N - dicinnamyl - 2 - chloroacetamide. Percent chlorine, calc'd: 10.9. Found: 11.5.
8 -------- N - (4-t-butylcinnamyl)-2-chloroacetamide. Percent chlorine, calc'd: 13.34. Found: 13.89.
9 -------- N - (4 - dimethylaminocinnamyl) - 2-chloroacetamide. Percent chlorine, calc'd: 12.26. Found: 12.28.

The value of animal feeds generally has been determined directly by feeding the animal. Within the past few years, however, the in vitro rumen technique whereby the changes occurring in feeds brought about by microorganisms are measured more readily and with great accuracy has been employed more frequently in the evaluation of animal feeds. This technique involves the use of an apparatus in which the digestive processes of the animals are conducted and studied in vitro. The animal feeds, rumen inoculum and various growth promotants are introduced into and withdrawn from a laboratory unit under carefully controlled conditions and the changes taking place are studied critically and progressively during the consumption of the feed by the microorganisms. The results obtained by use of the aforesaid transplanted rumen technique have been confirmed in vivo by actual feeding of animals.

Several parameters have been employed in the in vitro test methods to determine the effectiveness of the active growth promoting material. In the following examples the parameter employed in evaluating the 2-haloacetamides is the change in propionic acid content in the rumen fluids. An increase in the propionic acid content in the rumen fluid indicates that a desirable response in overall ruminant performance has been brought about by the 2-haloacetamides in the feed compositions. These in vitro observations have been confirmed by in vivo test methods in which rumen fluids are analyzed at the end of several days and by long-term in vivo feeding of ruminants over several months in which weight gain and feed efficiency are measured.

In the examples of the present invention which follow, evaluation of the 2-haloacetamides is made in vitro. The in vitro rumen fluids are analyzed by a gas chromatographic procedure to determine the change of propionic acid content therein. The change in propionic acid content is expressed as percent of the propionic acid content found in the control rumen fluid.

The following examples, in which parts and percent are expressed by weight unless otherwise indicated, further illustrate the advantages of this invention.

EXAMPLE 10

The in vitro experiments are fermentation reactions in which the conditions existing in the rumen are simulated. The test additive (534 mg.) is dissolved in 5 to 10 ml. of acetone or methylene chloride and mixed with 2 grams of a standard substrate (68% corn starch, 17% alpha-cellulose, and 15% soybean meal). The mixture is evaporated in a nitrogen atmosphere with constant stirring to provide a substrate coated with the test additive. This coated substrate (119 mg.) is mixed with 300 mg. of uncoated substrate and charged to 50 ml. Erlenmeyer flasks. Rumen fluid from a fasted sheep (7 to 8 hours) is taken, filtered through four layers of cheesecloth and 10 ml. of the fluid charged to each flask. A buffer solution of the following composition is prepared and adjusted to pH 6.8 with aqueous 4 N HCl.

| Buffer solution | grams per liter |
|---|---|
| $NaH_2PO_4$ | .316 |
| $KH_2PO_4$ | .152 |
| $NaHCO_3$ | 2.260 |
| KCl | .375 |
| NaCl | .375 |
| $MgSO_4$ | .112 |
| $CaCl_2$ | .038 |
| $FeSO_4 \cdot 7H_2O$ | .008 |
| $MnSO_4$ | .004 |
| $ZnSO_4 \cdot 7H_2O$ | .004 |
| $CuSO_4 \cdot 5H_2O$ | .002 |
| $CoCl_2$ | .001 |

Ten milliliters of the buffer solution are added to each flask. The flasks are purged with nitrogen, stoppered with pressure release valves and heated at 39° C.±0.5° C. on a water shaker bath. The fermentation mixtures are incubated for 16 hours and then analyzed to determine the propionate response. Results are given below in Table I.

TABLE I

| Compound: | Propionate response, percent of control |
|---|---|
| Control | 100 |
| N-(4'-t-butylcinnamyl)-2-chloroacetamide | 163 |
| N-[4' - (dimethylamino)cinnamyl] - 2 - chloroacetamide hydrochloride salt | 166 |
| N-(4'-n-butylcinnamyl)-2-chloroacetamide | 175 |
| N - 2',6' - dichlorocinnamyl) - 2 - chloroacetamide | 126 |
| N-2'-methylcinnamyl)-2-chloroacetamide | 145 |
| N-(4'-methylcinnamyl)-2-chloroacetamide | 134 |
| N-(4'-chlorobenzyl)-2-chloroacetamide | 163 |
| N-cinnamyl-2-chloroacetamide | 180 |

The 2-haloacetamides useful in this invention are incorporated in animal feed compositions in an effective amount over a wide range of concentrations. Significant animal responses are obtained with feed compositions containing from about 0.0001% by weight to about 0.1% by weight of 2-haloacetamides. Preferably, the feed compositions contain from about 0.0005% by weight to about 0.05% by weight of 2-haloacetamides.

Based on a fattening lamb consuming about 3 pounds of ration per day and cattle each consuming about 20 pounds of ration per day, the 2-haloacetamides are administered to sheep in an amount from about 0.0013 gm. to about 1.3 gm. per head per day, and to cattle in an amount from about 0.009 gm. to about 9.0 gm. per head per day. The 2-haloacetamides are preferably administered to sheep in an amount from about 0.007 gm. to about 0.7 gm. per head per day and to cattle in an amount from about 0.045 to about 4.5 gm. per head per day. However, the preferred amount will vary to some extent depending upon the age, weight and environment of the particular species of animal being fed.

The following 2-haloacetamides are illustrative of those useful in this invention:

N-(2',6'-dimethylcinnamyl)-2-chloroacetamide
N-(2',4',6'-trimethylcinnamyl)-2-chloroacetamide
N-(4'-methoxycinnamyl)-2-chloroacetamide
N-(4'-allylcinnamyl)-2-chloroacetamide
N-(2',4',5'-trichlorocinnamyl)-2-chloroacetamide
N-(2',4',6'-trichlorocinnamyl)-2-chloroacetamide
N-(2',4'-dibromocinnamyl)-2-chloroacetamide
N-[4'-(dibutylamino)cinnamyl]-2-chloroacetamide
N-[2'-(methylamino)cinnamyl]-2-chloroacetamide
hydrochloride salt of N-[4'-(dibutylamino)cinnamyl]-2-chloroacetamide
hydrochloride salt of N-[2'-(methylamino)cinnamyl]-2-chloroacetamide
hydrobromide salt of N-[4'-(dibutylamino)cinnamyl]-2-chloroacetamide
hydrobromide salt of N-[2'-(methylamino)cinnamyl]-2-chloroacetamide
N-(2-phenylethyl)-2-bromoacetamide
N-(3-phenylpropyl)-2-bromoacetamide
N-(4-phenylbutyl)-2-bromoacetamide
N-(4-phenylbutyl)-2-chloroacetamide
N-(4-phenyl-n-butenyl-2)-2-chloroacetamide
N-methyl-N-(2',6'-dimethylcinnamyl)-2-chloroacetamide
N-butyl-N-(2',4',6'-trimethylcinnamyl)-2-chloroacetamide
N-allyl-N-(4'-methoxycinnamyl)-2-chloroacetamide
N-phenyl-N-(4'-allylcinnamyl)-2-chloroacetamide
N-benzyl-N-(2',4',5'-trichlorocinnamyl)-2-chloroacetamide
N-methyl-N-(2',4',6'-trichlorocinnamyl)-2-chloroacetamide
N-cinnamyl-N-[4'-(dibutylamino)cinnamyl]-2-chloroacetamide
N-methyl-N-(2-phenylethyl)-2-bromoacetamide
N-butyl-N-(3-phenylpropyl)-2-bromoacetamide
N-allyl-N-(4-phenylbutyl)-2-bromoacetamide
N-phenyl-N-(4-phenylbutyl)-2-chloroacetamide
N,N-dicinnamyl-2-chloroacetamide The oral administration of 2-haloacetamides in accordance with this invention can be accomplished in the form of tablets, capsules, powders, solutions, suspensions or in admixture with one or more components of the animal's diet. Alternatively, the 2-haloacetamides can be administered in an equivalent amount in the animal's drinking water.

Conventional ruminant feed rations generally comprise at least about 2 percent plant ingredients such as hay, straw, silage, yellow corn, pasturage, ground corn cobs, cottonseed hulls, cotton mill wastes, beet pulp, corn meal, soybean meal, wheat bran, wheat middlings, dehydrated alfalfa, ground oats, millet, linseed meal, coconut meal, distillers, dried grains, peanut meal, cottonseed meal and the like plant products. Most ruminant feed rations also contain up to about 2 percent mineral ingredients such as bone meal, limestone, salt (NaCl) and the various trace minerals including salts of zinc, copper, manganese, cobalt, iodine, iron and the like. Other materials which can be incorporated into ruminant feed rations in varying amounts include animal ingredients such as fish meal, meat and bone scraps, dried milk, animal fats, dried whey solubles and the like; vitaminaceous ingredients such as vitamins A, $B_{12}$, D and K, as well as the B vitamins such as riboflavin, niacin, pantothenic acid or salts thereof, choline, pyridoxine, thiamine, nicotinic acid or salts thereof, biotin, folic acid and the like; amino acids such as methionine, phenylalanine, arginine, glycine, histidine, isoleucine, leucine, lysine, threonine, tryptophan, valine and the like; medicaments such as antibiotics, hormones and hormone simulators, steroids, arsenicals, anthelmintics and the like, and antioxidants, for example 6-ethoxy-2,2,4-trimethyl-1,2-dihydroquinoline, butylated hydroxy anisol, butylated hydroxy toluene, 4,4-bis(2,6-di-t-butyl phenol), gamma-tocopherol, esters of gallic acid, and the like.

The feed compositions of this invention can be prepared by incorporating the 2-haloacetamides in various ways into any or all components of conventional diets for the type of animal in question. The 2-haloacetamides can be added to the diet rations as the pure compounds, as a stabilized concentrate wherein the 2-haloacetamides are coated with a protective material such as gelatine or gelatine and sugar, as an adsorbate on silica gel, oatmeal, soybean meal, ion-exchange resins, as a simple admixture with a diluent such as cereal meal, and oil meal and stabilizers, or in solution or emulsion in a vegetable oil such as peanut oil, soybean oil, sesame oil and the like and preferably including a stabilizer. An oil solution or emulsion lends itself to spraying on the basal ration. Alternatively, the 2-haloacetamides can be mixed with other feed additives such as vitamins, antibiotics, minerals and other materials of this nature in a feed supplement which is supplied to grain mills or to feed manufacturers who then incorporate it into the finished diet to be supplied to the animals by the farmer. Blending of such materials can be accomplished in the usual type apparatus used for the preparation of dry feed products. For young animals the 2-haloacetamides can be incorporated into liquid or semi-liquid feeds or mashes in the form of a suspension or dispersion of the active material. An emulsion or dispersion in peanut oil, soybean oil, and the like can be prepared and these are particularly adapted for liquid compositions including drinking water. The 2-haloacetamides also can be administered to the animals subcutaneously or intramuscularly in the form of solutions, pastes or pellets, but it is generally more convenient to use the active material in the animal's feed composition.

Although the invention is described with respect to specific modifications, the details thereof are not to be construed as limitations.

The embodiments of the invention in which an exclusive property or privilege is claimed are defined as follows:

1. A method of improving the growth response in ruminant animals selected from the group consisting of cattle and sheep which comprises administering to said animals a growth-promoting amount of a compound of the formula

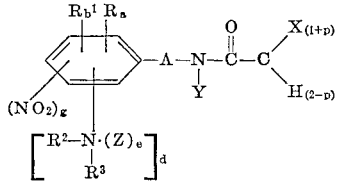

wherein X is halogen, $p$ is an integer from 0 to 2 inclusive, A is selected from the group consisting of alkylene of not more than 6 carbon atoms and alkenylene of at least 3 and not more than 6 carbon atoms, R is selected from the group consisting of alkyl, alkenyl and alkoxy of not more than 4 carbon atoms, $a$ is an integer from 0 to 5, $R^1$ is halogen, $b$ is an integer from 0 to 3, $R^2$ and $R^3$ are selected from the group consisting of hydrogen and alkyl of not more than four carbon atoms, $e$, $d$ and $g$ are each integers from 0 to 1, Z is an acid forming a physiologically acceptable acid addition salt, and Y is selected from the group consisting of hydrogen, alkyl, alkenyl, alkynyl, phenyl, phenylalkyl and cinnamyl of not more than 12 carbon atoms.

2. Method of claim 1 wherein the animals are cattle.

3. A method of improving the growth response in an animal selected from the class consisting of poultry, swine and ruminants which comprises feeding said animal a growth-promoting amount of a compound of the formula

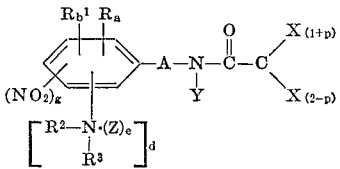

wherein X is halogen, $p$ is an integer from 0 to 2 inclusive, A is selected from the group consisting of alkylene of not more than 6 carbon atoms and alkenylene of at least 3 and not more than 6 carbon atoms, R is selected from the group consisting of alkyl, alkenyl and alkoxy of not more than 4 carbon atoms, $a$ is an integer from 0 to 5, $R^1$ is halogen, $b$ is an integer from 0 to 3, $R^2$ and $R^3$ are selected from the group consisting of hydrogen and alkyl of not more than four carbon atoms, $e$, $d$ and $g$ are each integers from 0 to 1, Z is an acid forming a physiologically acceptable acid addition salt, and Y is selected from the group consisting of hydrogen, alkyl, alkenyl, alkynyl, phenyl, phenylalkyl and cinnamyl of not more than 12 carbon atoms.

4. Method of claim 3 wherein the compound is added to the animal diet.

5. Method of claim 1 wherein A is alkenylene.

6. Method of claim 5 wherein the alkenylene is propenylene-2.

7. Method of claim 1 wherein $p$, $b$ and $d$ are zero.

8. Method of claim 1 wherein $p$, $a$ and $d$ are zero.

9. Method of claim 1 wherein $a$, $b$ and $p$ are zero.

10. Method of claim 1 wherein R is alkyl.

11. Method of claim 1 wherein p is 0 and X is chlorine.

12. Method of claim 1 wherein the compound is N-cinnamyl-2-chloroacetamide.

13. Method of claim 1 wherein the compound is N-(4'-n-butylcinnamyl)-2-chloroacetamide.

14. Method of claim 1 wherein the compound is N-(4'-chlorobenzyl)-2-chloroacetamide.

15. An animal feed composition comprising a conventional feed for an animal selected from the group consisting of poultry, swine and ruminants and from about 0.0001% by weight to about 0.1% by weight of a compound of the formula

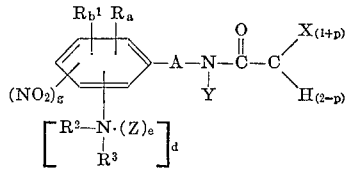

wherein X is halogen, $p$ is an integer from 0 to 2 inclusive, A is selected from the group consisting of alkylene of not more than 6 carbon atoms and alkenylene of at least 3 and not more than 6 carbon atoms, R is selected from the group consisting of alkyl, alkenyl and alkoxy of not more than 4 carbon atoms, $a$ is an integer from 0 to 5, $R^1$ is halogen, $b$ is an integer from 0 to 3, $R^2$ and $R^3$ are selected from the group consisting of hydrogen and alkyl of not more than four carbon atoms, $e$, $d$ and $g$ are each integers from 0 to 1, Z is an acid forming a physiologically acceptable acid addition salt, and Y is selected from the group consisting of hydrogen, alkyl, alkenyl, alkynyl, phenyl, phenylalkyl and cinnamyl of not more than 12 carbon atoms.

References Cited

UNITED STATES PATENTS

| | | | | |
|---|---|---|---|---|
| 2,863,752 | 12/1958 | Hamm et al. | | 260—562B |
| 3,133,808 | 5/1964 | Hamm | | 71—110 |

ALBERT T. MEYERS, Primary Examiner

V. D. TURNER, Assistant Examiner

U.S. Cl. X.R.

99—2

UNITED STATES PATENT OFFICE
CERTIFICATE OF CORRECTION

Patent No. 3,553,330          Dated January 5, 1971

Inventor(s) Ernest G. Jaworski et al

It is certified that error appears in the above-identified patent and that said Letters Patent are hereby corrected as shown below:

Column 7, Claim 3, that portion of the formula reading $$\diagdown X_{(2-p)} \quad \text{should read} \quad \diagdown H_{(2-p)}$$

Signed and sealed this 27th day of November 1973.

(SEAL)
Attest:

EDWARD M. FLETCHER, JR.        RENE D. TEGTMEYER
Attesting Officer               Acting Commissioner of Patent